May 29, 1934.  F. P. RYDER  1,960,853
PEA THRESHING MACHINE
Filed Oct. 16, 1929  2 Sheets-Sheet 1

Inventor
Frank P. Ryder,
By
Attorney

May 29, 1934.    F. P. RYDER    1,960,853
PEA THRESHING MACHINE
Filed Oct. 16, 1929    2 Sheets-Sheet 2
Fig.3.
Fig.4.
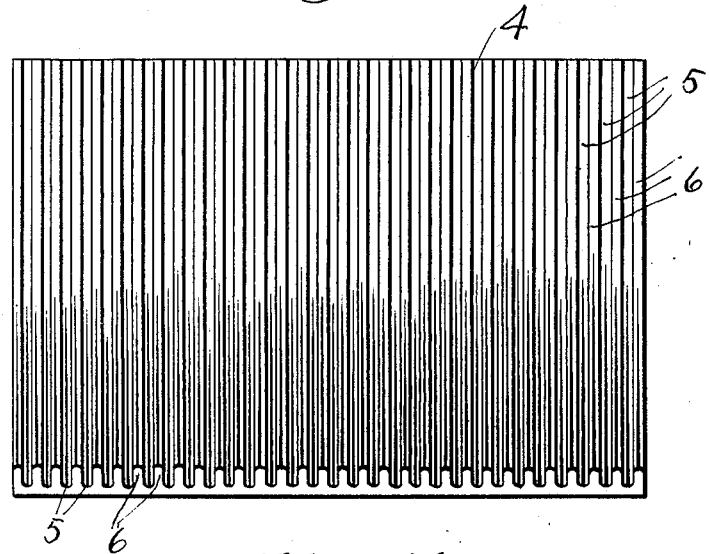
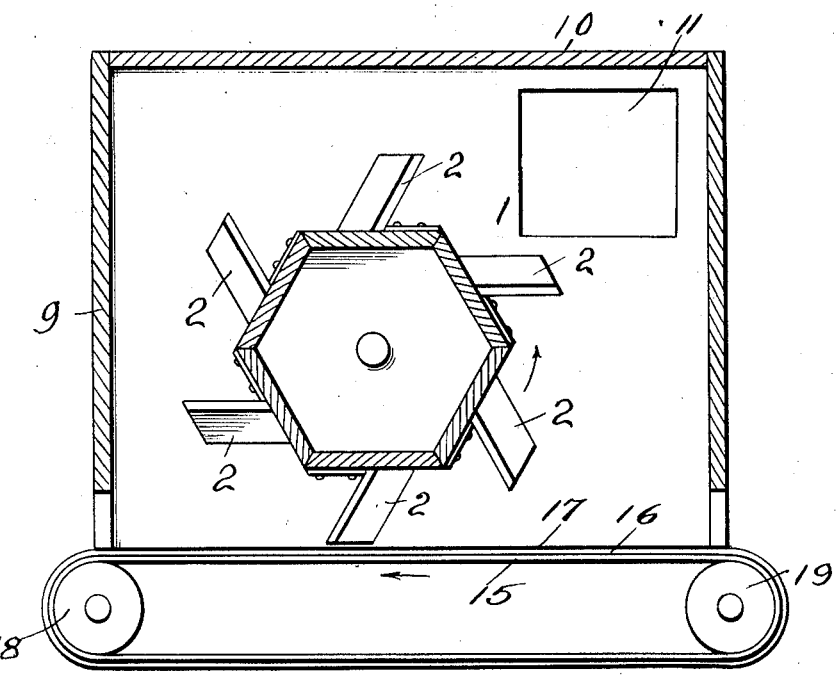
Fig.5.
Inventor
Frank P. Ryder,
By A. P. Greeley
Attorney Patented May 29, 1934

1,960,853

UNITED STATES PATENT OFFICE 1,960,853

PEA THRESHING MACHINE

Frank Pittis Ryder, Niagara Falls, N. Y.

Application October 16, 1929, Serial No. 400,095

7 Claims. (Cl. 130—30)

My invention relates to a method and means for threshing green peas and has for its object to simplify the method and apparatus commonly used for this purpose in which vines or bushes carrying pea pods are threshed in what is commonly known as a viner.

Viners as commonly constructed and used comprise a beater cylinder carrying beaters having their faces extending radially from the sides of the beater cylinder, rotating within an outer or lifting cylinder having longitudinal, inwardly projecting bars by which the vines are lifted and dropped into the path of the beaters, and having between the lifting bars perforated screens usually of rubber fabric through the perforations of which the peas and chaff dislodged by the beaters may escape. The faces of the beaters being radial the direction of the blow which they strike is directly upward and the movement of the vines effected by the blow is limited by the lifting bars and intervening screens of the lifting cylinder, and the blows of the beaters tend to carry the vines over the top of the beater cylinder and as the lifting cylinder rotates in the same direction with the rotation of the beater cylinder, though at a less speed, its lifting bars aid in carrying the vines over the top of the beater cylinder.

It is an object of my invention to so change the beater arms that they will act upon the vines to throw them away from the beater cylinder and will not carry them over the top of the cylinder, and to provide, in place of the rotating lifting cylinder surrounding the beater cylinder a non-rotating element extending opposite a portion only of the periphery of the beater cylinder, so arranged as to check the outward movement of the vines and to guide or conduct them back into the path of movement of the beaters. A further object of my invention is to provide the non-rotating element which takes the place of the lifting cylinder with grooves adapted to receive peas dislodged from the vines by the beaters and permit them to escape immediately from further beater action.

A further object of my invention is an improved method of threshing green peas in which the vines are thrown upward and outward into space which is so far unobstructed that the tendency of the vines to be compacted together by striking an obstruction will be overcome, and the vines will be returned into the path of movement of the beaters in better condition for effective operation of the beaters than if in a compact mass.

With the objects above indicated and other objects hereinafter explained in view, my invention consists in the method and construction and combination of elements hereinafter described and claimed.

Referring to the drawings:

Figure 3 is a view of the inner face of the stationary grooved slide board of Figure 1.

Figure 4 is a view similar to Figure 1 but showing a modification, and

Figure 5 is a fragmentary cross sectional view of the belt shown in Figure 4.

Figure 1:
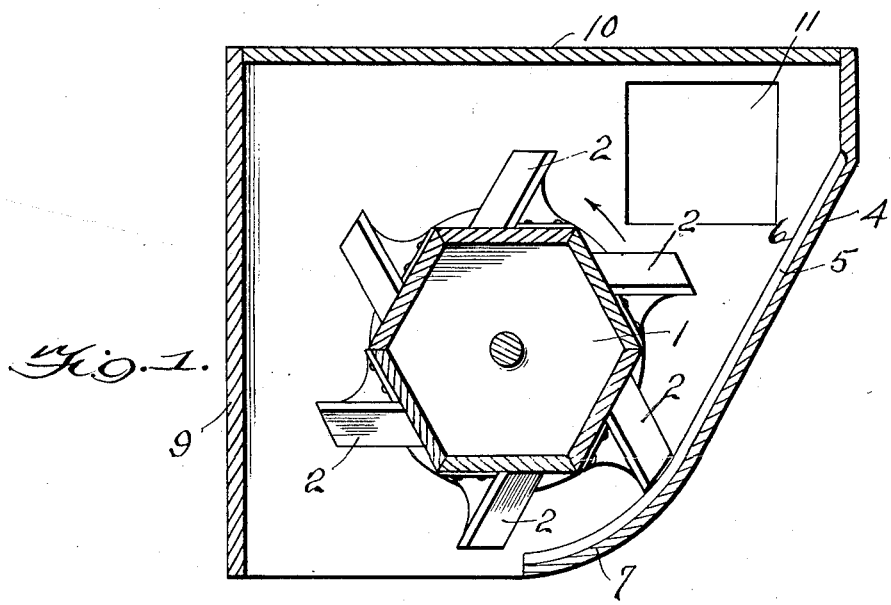
Figure 1 is a central cross-sectional view on line 1—1 of Figure 2 of a viner embodying my invention, and adapted to carry out my method of threshing.
Figure 2:
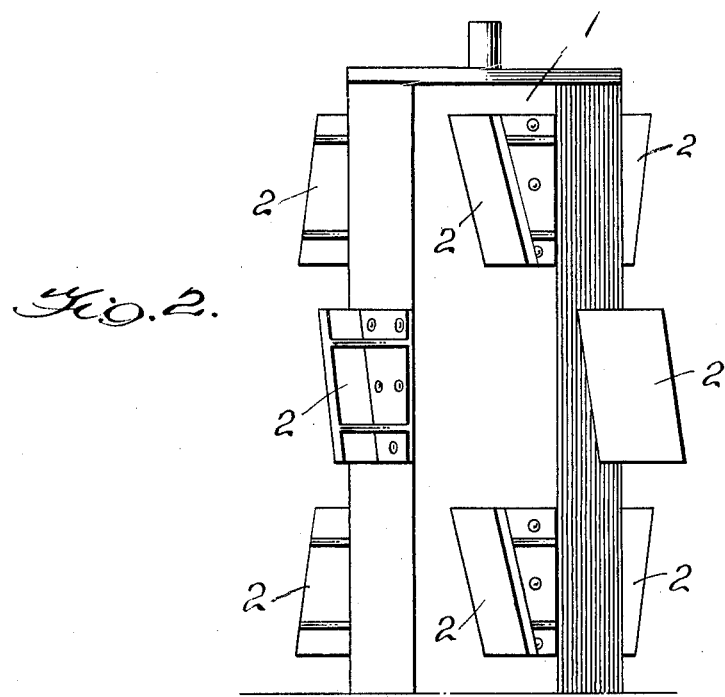
Figure 2 is a side view of the intake end portion of the beater cylinder.

In the drawings 1 indicates a six sided beater "cylinder" similar in construction to the beater cylinder used in the commonly known viner for threshing green peas and having on its sides beater arms 2 arranged as shown in Figure 2, that is, with the beater arms of each circumferential row on alternate sides so that there will be, on a six sided cylinder three beaters only in each row. Each of these beater arms 2 is set at such angle to the longitudinal axis of the central shaft as to cause the pea vines introduced at one end of the machine to move toward the other end as they are subjected to the action of the successive beater arms. But while the beater cylinder and the general arrangement of the beaters is similar to that usually found in viners the beaters or beater arms 2 instead of extending outward from the sides of the beater cylinder in a radial or nearly radial direction, have their beating faces, that is, the faces in the direction of rotation of the beater cylinder as indicated by the arrow in Figure 1, sloped so that they extend away and outward from the direction of rotation at an angle of approximately forty-five degrees to the line of a radius, though I do not desire to be limited to this particular angle as the inclination may be greater or less than forty-five degrees.

Opposite the beater cylinder on one side extending its entire length is a slide board 4 extending upward from about the level of the lowest point in the circle described by the outer ends of the beater arms to about the level of the highest point in that circuit and so arranged as to slope outward at a substantial angle to the perpendicular. This slide board is provided with a series of grooves 5 extending from the upper to the lower edge of the slide board in perpendicular or approximately perpendicular lines. These grooves are each of such width and depth as to permit peas of the largest size to enter and slide downward freely in them and are arranged close together separated one from another by ribs 6. This slide board is so arranged with reference to the beater cylinder that the ends of the beater arms will just clear the tops of ribs 6 and will not permit any vines to pass through between the ends of the beater arms and the slide board. The time interval between the passages of successive beater edges past the point of tangency to the tops of the ribs between grooves is so short that vines cannot pass down the slide board between the passage of successive beaters as they rotate. The slide board may be provided at its lower end with a portion 7 curved inwardly, that is, toward the vertical plane of the axis of shaft 3, for the purpose of preventing vines from passing down the slide board between successive beaters at low speed of the beater cylinder.

About the beater cylinder is an enclosing casing comprising a vertical side member 9, and top member 10, the side 9 and top 10 being for protection from the weather and not essential to the threshing operation.

In operation the vines are fed to one end of the enclosing casing above the beaters through a suitable opening as 11, here shown in the end of the casing, and are struck successive upward blows by the beaters. The peas are freed from the pods by the action of the beaters and run down the grooves of the slide board past the rotating beater edges while the vines drop back along the tops of the ribs between the grooves to be again struck by the beaters. The angle of inclination of the slide board is such that peas and vines will slide down it by gravity.

The sloping faces of the beaters prevent any of the vines from being carried over the top of the beater cylinder by beater action, the vines being thrown out tangentially against the slide board. The inclination of the beaters to the longitudinal axis of the beater cylinder causes the vines to move to the delivery end of the machine.

Peas and chaff sliding down the grooves of the slide board drop onto a separating apron such as is commonly used in viners.

The effect of the blows of the beaters on the vines in the construction shown in Figure 1 is to throw the vines upward and outward, that is, away from the vertical plane of the axial centre of the beater cylinder, in a direction tangential to the arc described by the outer edges of the beaters. In so far as the vines are thrown outward they would tend to drop out of reach of the beaters. This tendency is checked by the slide board so that as they drop by gravity against the slide board they slide down its inclined surface into the path of movement of the beaters to be again struck and thrown upward and outward.

In the construction shown in Figure 1 the means for restricting the outward tendency of the vines is the inclined slide board 4 and in this construction the direction of movement of the vines struck by the beaters is upward and outward, and the vines drop back by gravity. In Figure 4 I have shown a modified construction in which instead of the slide board 4 an endless belt 15 having grooves 16 in its face with intervening ribs 17 and carried by rollers 18 and 19, is arranged below the beater cylinder, its ribs 17 being arranged to just clear the outer edge of the beaters as the beater cylinder rotates, the belt being so driven that its surface presented to the beater cylinder will carry vines thrown onto it by the beaters back into the path of their movement.

The general operation is the same as in the construction shown in Figure 1, that is, the beaters will throw the vines in a tangential direction to drop onto the belt and be brought back by it for successive blows. The peas and chaff will fall into the grooves of the belt and be carried by it to roller 18 and will drop from the belt into a suitable belt.

While the grooved belt here shown with the surface presented to the beater cylinder horizontal it is to be understood that the rollers carrying the belt may be so arranged that this surface of the belt will be at any desired angle between the horizontal and the angle of the slide board 4, provided only that this surface of the belt is tangential to the arc described by the edges of the beaters.

There being no obstruction to the free outward and upward movement of the vines struck by the beaters they will tend to separate or spread apart as they leave the beaters and pass into the space between the upper end of slide board 4 in Figure 1, or the space above belt 15 to the right of the beater cylinder in Figure 4, instead of being compacted together into a mass which would be rolled over and over by successive blows of the beaters as is the tendency where vines are driven against an obstruction.

Having thus described my invention what I claim is:—

1. In a machine for threshing green peas or beans, a beater cylinder, a series of beater arms carried by the beater cylinder and a stationary slide board arranged opposite one side of the beater cylinder having vertically extending grooves formed in the face presented to the beater cylinder.

2. In a machine for threshing green peas or beans, a beater cylinder, a series of beater arms carried by the beater cylinder and a stationary slide board arranged opposite one side of the beater cylinder extending upward and away from the beater cylinder, and having vertically extending grooves formed in its face presented to the beater cylinder.

3. In a machine for threshing green peas or beans, a beater cylinder, a series of beater arms carried by the beater cylinder a casing for the beater cylinder having therein a feed opening for the vines above the path of the beater arms in their upward movement, and a stationary slide board arranged opposite one side of the beater cylinder terminating at its lower edge in approximately the vertical plane of the axis of the beater cylinder, the faces of the beater arms being sloped at a substantial angle from the line of radius of the beater cylinder in a direction away from the direction of rotation.

4. In a machine for threshing green peas or beans, a beater cylinder, a series of beater arms carried by the beater cylinder, a casing for the beater cylinder having therein a feed opening for the vines above the path of the beater arms in their upward movement, and a stationary slide board having vertically extending grooves formed therein arranged opposite one side of the beater cylinder, said slide board terminating at its lower edge in approximately the vertical plane of the axis of the beater cylinder, the faces of the beater arms being sloped at a substantial angle from the line of radius of the beater cylinder in a direction away from the direction of rotation.

5. In a machine for threshing green peas or beans, a beater cylinder, a series of beater arms carried by the beater cylinder, a casing for the beater cylinder having therein a feed opening for the vines above the path of the beater arms in their upward movement, and a stationary slide board having vertically extending grooves formed therein and extending upward and outward opposite one side of the beater cylinder said slide board terminating at its lower edge in approximately the vertical plane of the axis of the beater cylinder, the faces of the beater arms being sloped at a substantial angle from the line of radius of the beater cylinder in a direction away from the direction of rotation.

6. In a machine for threshing green peas or beans, a beater cylinder, a series of beater arms carried by the beater cylinder and a stationary slide board arranged opposite the side of the beater cylinder on which the beater arms move upward terminating at its lower end approximately in line with the vertical plane of the axis of the beater cylinder, the faces of the beater arms being sloped at a substantial angle from the line of radius of the beater cylinder in a direction away from the direction of rotation, and a feed opening for the vines above the path of movement of the upwardly moving beater arms between the beater cylinder and the upper end of the slide board.

7. In a machine for threshing green peas or beans, a beater cylinder, a series of beater arms carried by the beater cylinder and a stationary slide board arranged opposite one side of the beater cylinder having its lower edge approximately in line with the vertical plane of the axis of the beater cylinder and inclined therefrom upwardly and away from the beater cylinder, the faces of the beater arms being sloped at a substantial angle from the line of radius of the beater cylinder in a direction away from the direction of rotation and an opening for feeding vines to the space between the beater cylinder and the upper end of the slide board.

FRANK PITTIS RYDER.